(12) United States Patent
Agrwal et al.

(10) Patent No.: US 11,308,044 B2
(45) Date of Patent: *Apr. 19, 2022

(54) RULE BASED DECISIONING ON METADATA LAYERS

(71) Applicant: American Express Travel Related Services Company, Inc., New York, NY (US)

(72) Inventors: Vineet Agrwal, Jersey City, NJ (US); Ravi Arasan, Basking Ridge, NJ (US); Atul R. Dalmia, Jersey City, NJ (US); Pratiksha M. Jogani, Jersey City, NJ (US); Kunal C. Joshi, Jersey City, NJ (US); Ravi Kaushik, Westwood, NJ (US); Himanshu Prabhakar, Bayonne, NJ (US); Kandarp Srivastava, New York, NY (US)

(73) Assignee: American Express Travel Related Services Company, Inc., New York, NY (US)

(*) Notice: Subject to any disclaimer, the term of this patent is extended or adjusted under 35 U.S.C. 154(b) by 250 days.

This patent is subject to a terminal disclaimer.

(21) Appl. No.: 15/910,135

(22) Filed: Mar. 2, 2018

(65) Prior Publication Data
US 2018/0189329 A1    Jul. 5, 2018

Related U.S. Application Data

(63) Continuation of application No. 14/799,293, filed on Jul. 14, 2015, now Pat. No. 9,934,257.

(51) Int. Cl.
*G06F 16/00* (2019.01)
*G06F 16/21* (2019.01)

(52) U.S. Cl.
CPC .................................. *G06F 16/21* (2019.01)

(58) Field of Classification Search
CPC ..................................................... G06F 16/00
See application file for complete search history.

(56) References Cited

U.S. PATENT DOCUMENTS

2005/0060317 A1    3/2005   Lott
2007/0040094 A1*   2/2007   Smith .............. G06K 9/6253
                                                  250/202

(Continued)

OTHER PUBLICATIONS

Non-Final Office Action dated Dec. 1, 2017 in U.S. Appl. No. 14/944,961.

(Continued)

*Primary Examiner* — Khanh B Pham
(74) *Attorney, Agent, or Firm* — Thomas | Horstemeyer LLP (57) ABSTRACT

The process includes receiving a data set comprising a plurality of rows and a plurality of columns, and applying a first rule based decisioning to the data set to generate a first layer of metadata that comprises at least one of a key, a type indicator, a categorical indicator, and/or a continuous indicator. The first layer of metadata may be descriptive of the data set. The processor may further apply a second rule based decisioning to the first layer to generate a second layer that includes at least one of the key, the type indicator, the categorical indicator, or the continuous indicator. The second layer may be descriptive of the first layer. The process may also include generating an output file from at least one of the first layer or the second layer.

20 Claims, 3 Drawing Sheets

(56) References Cited

U.S. PATENT DOCUMENTS

| | | | |
|---|---|---|---|
| 2007/0174852 A1 | 7/2007 | Smirnov | |
| 2007/0255553 A1* | 11/2007 | Nomoto | G06F 16/313 704/9 |
| 2008/0140696 A1* | 6/2008 | Mathuria | G06F 16/221 707/999.102 |
| 2008/0168036 A1* | 7/2008 | Young | G06F 16/258 707/999.003 |
| 2011/0029580 A1* | 2/2011 | Popovski | G06F 3/0611 707/812 |
| 2011/0029852 A1* | 2/2011 | Naibo | G06F 40/18 715/212 |
| 2014/0181130 A1 | 6/2014 | Davis | |
| 2014/0365363 A1 | 12/2014 | Knudsen | |
| 2015/0324900 A1 | 11/2015 | Starikova | |
| 2017/0052984 A1 | 2/2017 | Treiser | |
| 2017/0139746 A1 | 5/2017 | Maier | |

OTHER PUBLICATIONS

Notice of Allowance dated Aug. 27, 2019 in U.S. Appl. No. 16/105,292.
USPTO; Non-Final Office Action dated Aug. 10, 2017 in U.S. Appl. No. 14/799,293.
USPTO; Notice of Allowance dated Jan. 3, 2018 in U.S. Appl. No. 14/799,293.

\* cited by examiner

RULE BASED DECISIONING ON METADATA LAYERS

CROSS REFERENCE TO RELATED APPLICATIONS

This application is a continuation of, claims priority to and the benefit of, U.S. Ser. No. 14/799,293 filed Jul. 14, 2015 and entitled "SYSTEM AND METHOD FOR RECURSIVE METADATA LAYERS ON BIG DATA SETS," which is incorporated herein in its entirety for all purposes.

FIELD

The present disclosure relates to creating metadata to describe big data sets using recursive layers.

BACKGROUND

Large data sets may exist in various levels of size and organization. With big data comprising data sets as large as ever, the volume of data collected incident to the increased popularity of online and electronic transactions continues to grow. Billions of rows and hundreds of thousands of columns worth of data may populate a single table, for example. The large volume of data may be collected in a raw, unstructured, and undescriptive format in some instances. The large volume of unorganized information may not be informative to users without some sort of processing to identify patterns and trends in the data. For example, an unaided user may look at a big data set, without being able to decipher the name of a field, whether the field is unique, how the field is populated, what type of data the field contains, and/or any other details about the field. Without meaningful descriptors of the columns and cells, the collection of data may not be beneficial to a user. However, the size and varied structure of big data sets is typically incompatible with traditional data analysis techniques.

SUMMARY

A system, method, and computer readable medium (collectively, the "system") is disclosed for recursively creating metadata for large data sets. The system may be configured to perform operations and/or steps comprising receiving, by a processor, a data set comprising a plurality of rows and a plurality of columns. The processor may apply a first rule based decisioning to the data set to generate a first layer of metadata that comprises at least one of a key, a type indicator, a categorical indicator, or a continuous indicator. The first layer of metadata may be descriptive of the data set. The processor may further apply a second rule based decisioning to the first layer to generate a second layer that includes at least one of the key, the type indicator, the categorical indicator, or the continuous indicator. The second layer may be descriptive of the first layer. The system may also include generating, by the processor, an output file from at least one of the first layer or the second layer.

In various embodiments, the system may comprise running, by the processor, a regular expression on the first layer. The processor may further compute percentile calculations for a column of the plurality of columns. The first layer and the second layer may be formatted by the processor for recursive decisioning. The data set may be stored on a distributed storage system. The system may also include communicating, by the processor, with the distributed storage across a network. The processor may be in a node of the distributed storage system.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Figure 1:
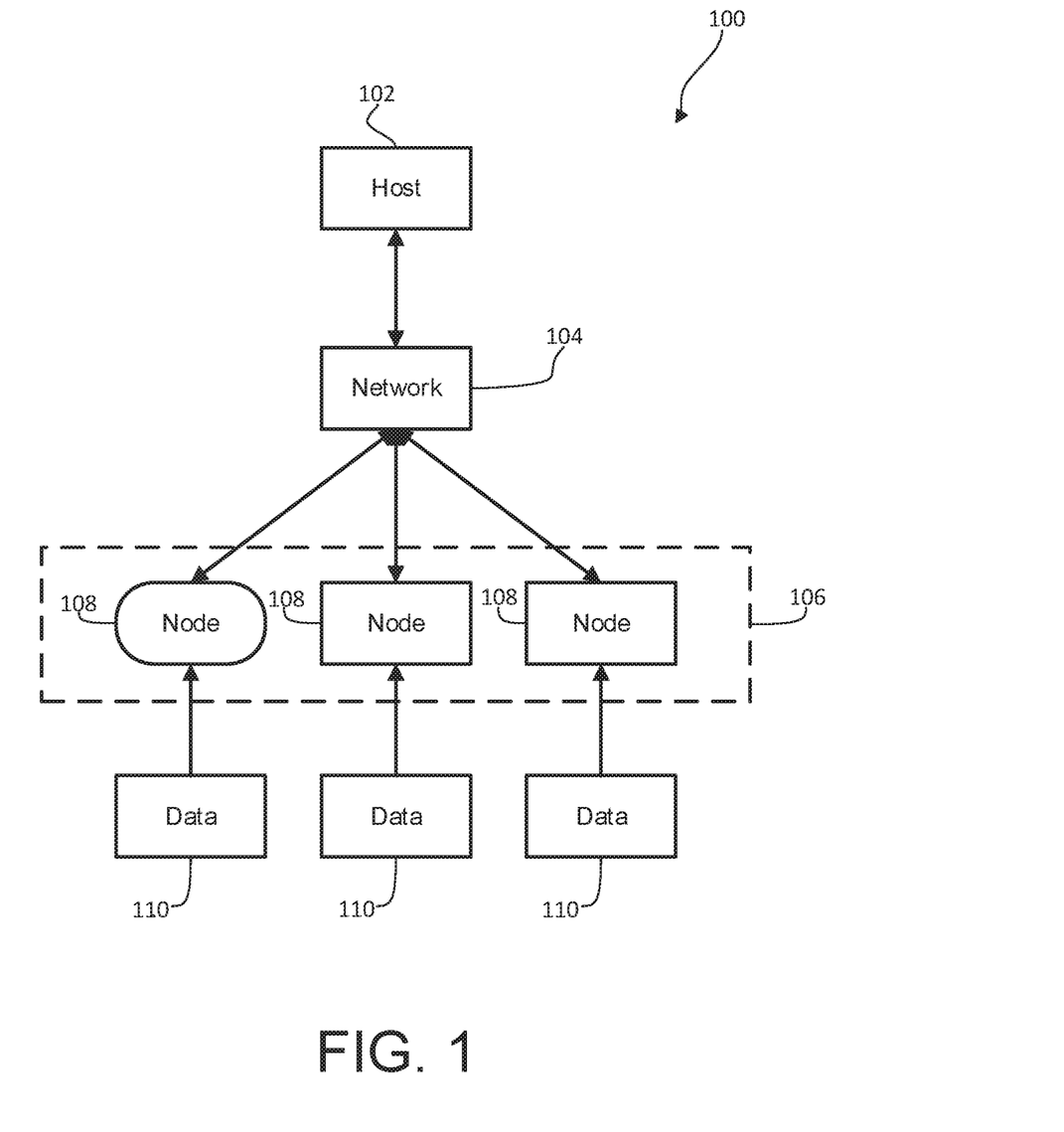
FIG. 1 illustrates an exemplary system for distributed storage and distributed processing, in accordance with various embodiments.

With reference to FIG. 1, system 100 for distributed data storage and processing is shown, in accordance with various embodiments. System 100 may comprise a host 102. Host 102 may comprise any device capable of receiving and displaying an electronic message via network 104. For example, host 102 may take the form of a computer or processor, or a set of computers/processors, although other types of computing units or systems may be used, including laptops, notebooks, hand held computers, personal digital assistants, cellular phones, smart phones (e.g., iPhone®, BlackBerry®, Android®, etc.) tablets, wearables (e.g., smart watches and smart glasses), or any other device capable of receiving data over network 104.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

In various embodiments, host 102 may interact with distributed storage system 106 for storage and/or processing of big data sets or other data sets suitable for recursive metadata creation and analysis. As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

In various embodiments, distributed storage system 106 may comprise one or more nodes 108. Nodes 108 may comprise computers or processors the same as or similar to host 102. Nodes 108 may be distributed geographically in different locations, housed in the same building, and/or housed in the same rack. Nodes 108 may also be configured to function in concert to provide storage space and/or processing power greater than a single node 108 might provide alone. As a result, distributed storage system 106 may collect and/or store data 110. Data 110 may be collected by nodes 108 individually and compiled or in concert and collated. Data 110 may further be compiled into a data set and formatted for use in system 200 of FIG. 2.

In various embodiments, data 110 may comprise a collection of data including and/or originating from customer information, transaction information, account information, record of sales, account history, customer history, sensor data, machine log data, data storage system, public web data, and/or social media. Data 110 may be collected from multiple sources and amalgamated into a big data structure such as a file, for example. In that regard, the data may be used as an input to generate metadata describing the big data structure itself as well as the data stored in the structure.

Figure 2:
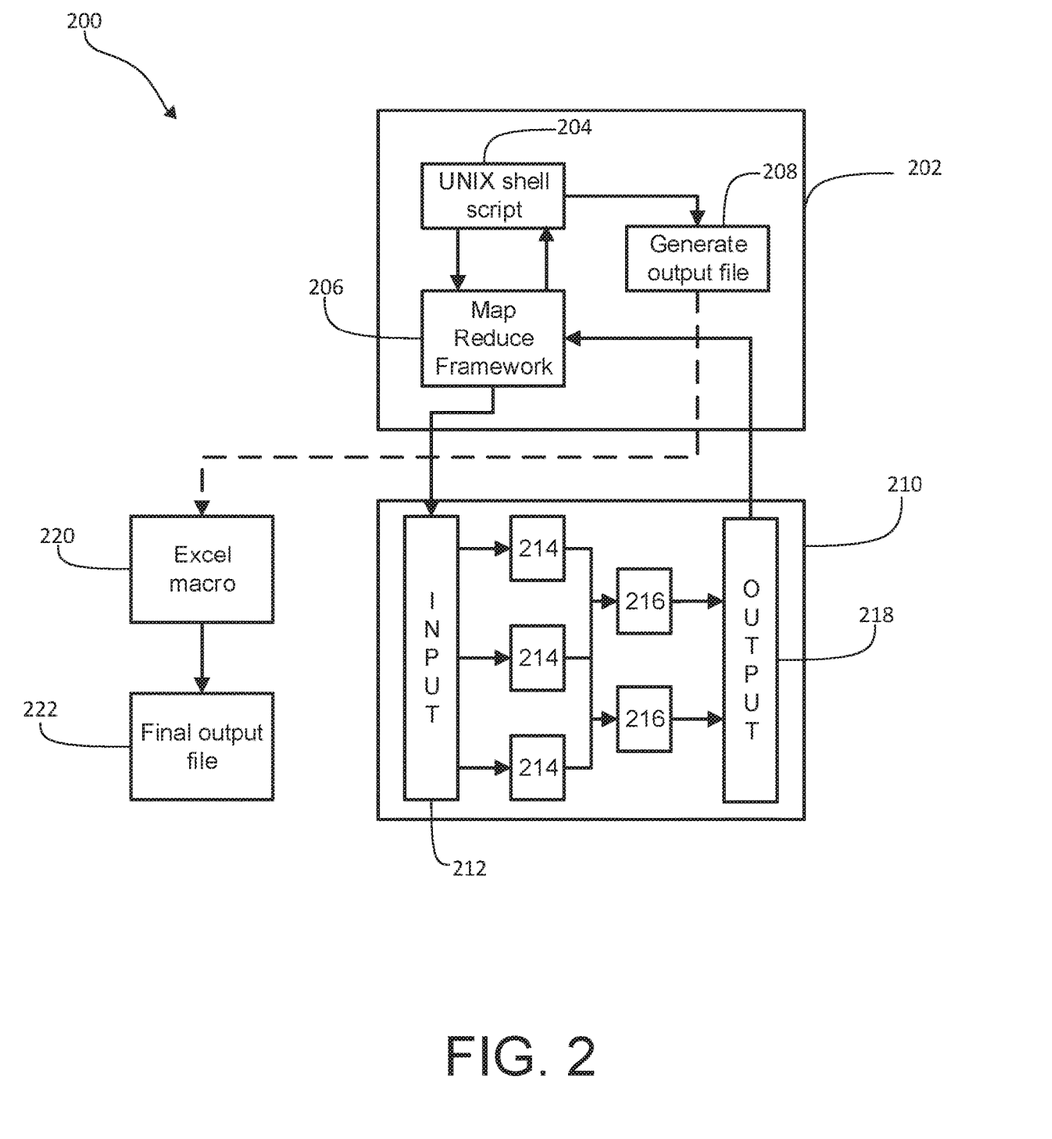
FIG. 2 illustrates an exemplary system for recursively analyzing big data, in accordance with various embodiments.

In various embodiments, and with reference to FIG. 2, system 200 is an exemplary solution for executing a recursive metadata generation algorithm on system 100 of FIG. 1. System 200 may comprise a UNIX shell script 204. UNIX shell script 204 may be a sequence of shell commands for execution on a host (e.g., host 102 of FIG. 1) to interact with distributed storage system 106. UNIX shell script 204 may include commands for interacting with a HIVE via a command line interface. UNIX shell script 204 may thus include HIVE function calls that request actions from an underlying Hadoop system (i.e., distributed storage 106 in FIG. 1 may be configured to map and reduce data using the Hadoop framework) or another suitable big data storage framework.

In various embodiments, system 200 may comprise a map/reduce framework 210. Map/reduce framework 210 may enable the generation of big data sets across distributed storage system 106 of FIG. 1 using sorting and summarization to organize and distribute data across the distributed storage system. The map/reduce framework 210 may accept an input 212. Input 212 may be data 110 of FIG. 1 to be processed through mapping steps 214 (i.e., sorting) and reduction steps 216 (i.e., summarization). Reduced data may then be combined to form an output 218 distributed across the distributed storage system 106 of FIG. 1 in the form of a big data set.

In various embodiments, system 200 may then return output 218 to UNIX shell script 204 in response to a function call executed by the script. UNIX environment 202 may execute repeated commands using the Map Reduce Framework 206 to interact with output 218. In that regard, UNIX shell script 204 may implement a recursive and/or looped analysis of input 212 using map/reduce framework 210. UNIX shell script 204 may further comprise conditions and/or instructions to detect when further HIVE commands are no longer desirable. UNIX shell script 204 may then generate output 218. The output file may be in a raw form suitable to formatting by an excel macro 220, for example. Although Excel is given as an example, any flat file presentation or tabular organization suitable to human reading may be suitable for final output file 222.

Figure 3:
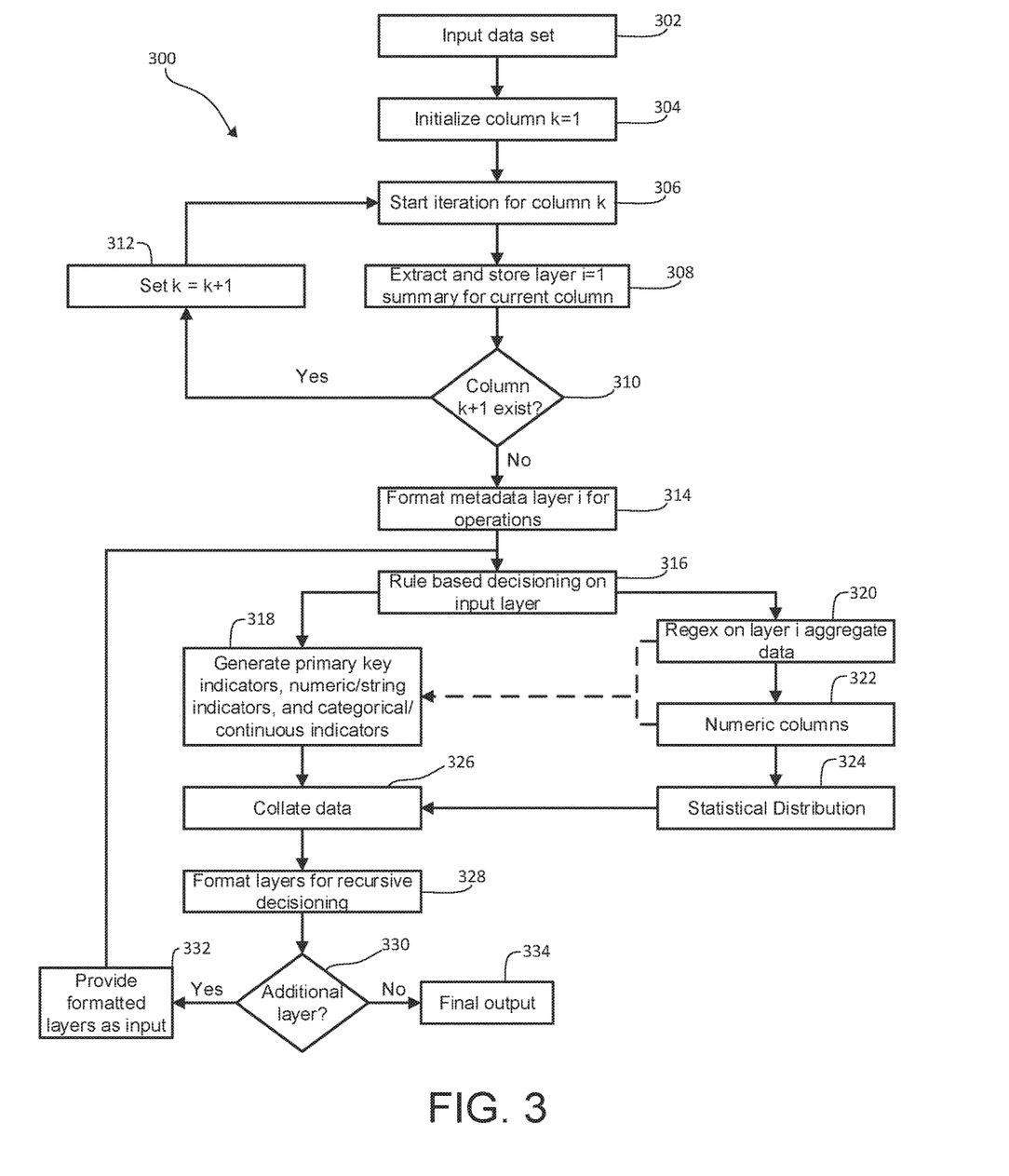
FIG. 3 illustrates an exemplary process for recursively analyzing big data, in accordance with various embodiments.

In various embodiments, and with reference to FIG. 3, process 300 for recursive analysis of big data sets using system 100 of FIG. 1 is shown. Process 300 may include the step of inputting a data set (Step 302). The data set used as an input may be a big data set similar to the output 218 of map/reduce framework 210 in FIG. 2. In response to the data set of Step 302 being provided as input, process 300 may initialize column k=1 (Step 304) for a first column. Columns may be analyzed (e.g., one by one) to accumulate a layer of metadata describing the input data set of Step 302. Process 300 may include starting an iteration from column k (Step 306) to identify qualitative and quantitative traits of column k such as whether the column stores numeric or string data, the number of filled cells in the column, the most common values in the column, and/or other suitable descriptive traits of the column. The system may then extract and store a first layer i=1 (i.e., a first metadata layer) summary for column k (Step 308) including the traits identified in step 306. The system may then determine whether column k+1 exists (Step 310). The system may set k=k+1 (Step 312) to move to the next row for processing in response to detecting that a column k+1 exists. After incrementing k=k+1, the process may return to start the next iteration by returning to Step 306 and analyzing the next column. In that regard, creating the first metadata layer may be an iterative process analyzing each column in the data set one at a time.

In various embodiments, the system may format the first metadata layer (i=1) for operations (Step 314) in response to detecting that column k+1 does not exist. Formatting metadata layer i for operations may include compiling all metadata for generated for layer i into a single table with rows corresponding to field values. The system may then perform rule based decisioning on layer i (Step 316) to apply varying analysis techniques depending on the data contained in layer i. Rule based decisioning may result in generating primary key indicators, numeric/string indicators, and/or categorical/continuous indicators (Step 318). Keys may be unique identifiers for different rows in the data set input in step 302. For example, a column that is a key may be a personal identifier such as a social security number or account number associated with an individual person or account. Numeric/string indicators may be assigned based on the contents of the rows in a column. For example, if a column contains only numeric data the column may be identified as a numeric column. Similarly, if a column contains only string data then the column may be identified as a string column. Categorical indicators may identify data as descriptive of a discrete characteristics (e.g., male/female gender indicators), and continuous indicators may identify data as representative of measurements on a continuous scale (e.g., quantitative data).

In various embodiments, data types (e.g., for use in the rule based decisioning in Step 316) may be identified using in part regular expressions (regex) executed on layer i aggregate data (Step 320) to detect patterns and/or determine whether a column is a string (e.g., text based) column or a numeric (e.g., integer or real number) column. Numeric columns (Step 322) may be used along with the results of the Regex in generating possible keys, column type identifiers, and categories in rule based decisioning of Step 316. For example, numeric columns may be subject to a determination of the minimum value, maximum value, arithmetic mean, median, mode, frequency, or other numeric analysis. Text columns may be subject to fewer modes of analysis than are suitable to numeric columns. For example, frequency distribution and counting appearances of each string apply to text readily while the arithmetic mean may not.

In various embodiments, analysis may also include numerical analysis of data in each column such as counts and their corresponding statistical distributions (Step 324). For example, the top five most frequently appearing values in each column may be identified and the number of appearances counted. The numbers appearing at the $95^{th}$ percentile, $75^{th}$ percentile, $50^{th}$ percentile, $25^{th}$ percentile, or numbers at other suitable distribution points may also be identified and included in the second metadata layer.

The resulting data from the foregoing steps may be collated (Step 326). Collating may include incorporating previous output layers and the current output layer into a single table and/or file, for example. Layer i may further be formatted for recursive decisioning (Step 328). The formatting may include condensing the table into the least possible number of rows and columns. The system may identify duplicate columns, for example, and delete the duplicate columns where appropriate.

In various embodiments, the system may then determine whether to execute a recursive rule based decisioning call for an additional metadata layer (Step 330). The system may produce final output (Step 334) in response to determining that no further metadata layers are appropriate. The system may provide the formatted layers from Step 328 as an input in a recursive function call (Step 332) in response to determining that an additional metadata layer is appropriate. The following tables include exemplary layers generated using process 300.

TABLE T1

Exemplary first layer output data.

| key | 1000000 | 1000000 | | | | | | |
|---|---|---|---|---|---|---|---|---|
| key | 1001473 | 1 | 1001478 | 1 | 1001494 | 1 | 1001523 | 1 |
| statename | 1000000 | 53 | | | | | | |
| statename | CA | 112790 | FL | 102554 | TX | 80205 | NY | 57725 |
| sales | 1000000 | 15957 | | | | | | |
| sales | 0 | 142795 | 110000 | 55459 | 120000 | 45259 | 130000 | 40408 |
| firstname | 865942 | 50106 | | | | | | |
| firstname | John | 21328 | Robert | 17638 | David | 17344 | Michael | 16735 |
| status_ind | 1000000 | 3 | | | | | | |
| status_ind | 0 | 925065 | 2 | 59439 | 1 | 15496 | | |
| subsidiary_ind | 1000000 | 2 | | | | | | |
| subsidiary_ind | 0 | 994703 | 3 | 5297 | | | | |

Table T1 shows first layer output containing metadata generated by evaluating each row and/or column (e.g., after finding no further columns k+1 in Step 310). The table T1 as presented may have two rows for each field, but the two rows may also be compressed into a single row for each field or split out into more rows for each field. The first layer data shown in table T1 may not be human readable but may be formatted for input for generating subsequent layers. Table T1 may contain a count (of the number of non-empty entries) and a unique count (of the number of unique entries) for each field appearing in the table. The counts are shown in the first row for each field of table T1. For example, the input data was found to have a count of 1,000,000 non-empty entries for the field "key" and a unique count of 1,000,000, indicating that each entry in the "key" field is unique.

In various embodiments, table T1 may also include the most frequently appearing entries in each column and the count of the number of times each entry appears in the second row for each field. For example, each entry in the "key" field has a count of one as each entry in the "key" field is also unique. The "firstname" field has duplicative entries with the name John appearing 21,328 times, the name Robert appearing 17,638 times, and the name David appearing 17,344 times. Thus, the first layer output may comprise an overall count, a unique count, the most frequent entries, and/or the count for the most frequent entries. The first layer output may then be used as an input to generate a second layer.

TABLE T2

Exemplary second layer output data.

| Field | Type | MIN | MAX | AVG | P01 | P05 | P25 | P50 | P75 |
|---|---|---|---|---|---|---|---|---|---|
| status_ind | String | | | | | | | | |
| subsidiary_ind | String | | | | | | | | |
| key | Num | | | | | | | | |
| firstname | String | | | | | | | | |
| sales | Num | 0 | 6570000 | 691038 | 0.00585 | 0.00585 | 55957 | 98910 | 149990 |
| statename | String | | | | | | | | |

In various embodiments, the original input data as well as the first layer output (e.g., the data in table T1) may be used to generate a second layer. The second layer may comprise a type indicator for each field as well as additional numeric metrics for the numeric fields that are not categorical and not unique keys. For example, a type determination may be made (e.g., using regular expressions of Step 320) as to whether a field contains string or numeric data. In table T2, the fields "key" and "sales" both contain numeric data, and the fields "status_ind," "subsidiary_ind," "firstname," and "statename" each contain string values. The "sales" field may be a non-categorical, non-key field with numeric type and thus have a minimum value, maximum value, 1 percentile, 5 percentile, 25 percentile, 50 percentile, 95 percentile, and 99 percentile values calculated (e.g., as described with reference to Step 324). Other suitable percentile values and/or numeric characteristics of the numeric columns may also be prepared. The "key" field may be identified as numeric (e.g., during indicator generation in Step 318), as each non-empty entry may be a number. The "key" field may also be a unique key since each row has a distinct, non-empty value. Numeric data such as the minimum value and the maximum value may not be calculated for unique keys.

TABLE T3

Exemplary output data generated for the third layer.

| Possible Key | Categorical |
|---|---|
| N | Y |
| N | Y |
| Y | N |
| N | N |
| N | N |
| N | N |

In various embodiments, the first layer and second layer outputs may be collated (e.g., in collation Step 326) to generate a third output layer. The third layer may include the first layer output, the second layer output, and additional information derived from the first and second layer and shown in Table T3. For example, the "key" field may have a possible key flag set for example because each non-empty entry in the data set is unique. Similarly, categorical/continuous indicators may be generated. The additional third layer of table T3 may indicate that "status_ind" and "subsidiary_ind" fields are categorical fields and "key," "firstname," "sales," and "statename" are continuous. If no further layers are desired based on the original input, then the output from the first layer, the second layer, and the third layer may all be collated and organized in a human readable form to produce a final output (e.g., in Step 334).

In various embodiments, the final output may include the count and unique count from the first layer output, the top entries and top counts from the first layer output, the numerical values from the second output layer, and the key and categorical identifiers generated for the third output layer. In that regard, the final output layer may include the metadata generated by each previous output layer. The final output may be formatted, for example, using a visual basic macro, into a suitable human readable form.

The systems and methods herein enable a user to view and/or analyze big data sets with recursively generated metadata. The metadata may describe the contents of columns and provide keys to meaningfully identify rows of the big data set. In that regard, the big data set may be readily viewed and understood be a user that otherwise may not be able to meaningfully view.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YouTube®, AppleTV®, Pandora®, xBox®, Sony® Playstation®), a uniform resource locator ("URL"), a document (e.g., a Microsoft Word® document, a Microsoft Excel® document, an Adobe .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include Facebook®, Foursquare®, Twitter®, My Space®, LinkedIn®, and the like. Examples of affiliate or partner websites include American Express®, Groupon®, LivingSocial®, and the like. Moreover, examples of mobile device communications include texting, email, and mobile applications for smartphones.

A "consumer profile," "customer data," or "consumer profile data" may comprise any information or data about a consumer that describes an attribute associated with the consumer (e.g., a preference, an interest, demographic information, personally identifying information, and the like).

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT®, Windows 95/98/2000®, Windows XP®, Windows Vista®, Windows 7®, OS2, UNIX®, Linux®, Solaris®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, and optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
generating, by a processor, a numerical indicator for a portion of a first layer of metadata of a data set based at least in part on a first rule based decisioning determining that the portion of the first layer of metadata includes numerical data;
applying, by the processor, a second rule based decisioning to the first layer of metadata to generate a second layer of metadata, wherein the second layer of metadata comprises the numerical indicator and a numeric analysis for the portion of the first layer of the metadata that includes the numerical data;
generating, by the processor, a third layer of metadata by collating the first layer of metadata and the second layer of metadata into a table for a file, wherein the first layer of metadata and the second layer of metadata collated in an order in which the first layer of metadata and the second layer of metadata were generated, and the third layer of metadata comprises derived data that is generated from a combination of the first layer of metadata and the second layer of metadata;
determining, by the processor, to generate a fourth layer of metadata based at least in part on the third layer of metadata;
executing, by the processor, a function call based at least in part on an input of the third layer of metadata, wherein the third layer of metadata is inputted to the function call in response to the determination to generate the fourth layer of metadata, and the function call generates the fourth layer of metadata; and
generating, by the processor, an output file based at least in part on the fourth layer of metadata.

2. The method of claim 1, further comprising:
receiving, by the processor, the data set comprising data within a plurality of rows and a plurality of columns;
analyzing, by the processor, a first column of the plurality of columns in the data set to identify traits of the first column; and
iteratively analyzing, by the processor, each additional column of the plurality of columns in the data set to identify traits of each additional column.

3. The method of claim 1, wherein the first layer of metadata comprises a respective indicator for a column that stores at least one of: string data, a number of filled cells in the column, or a most common value identified in the column.

4. The method of claim 1, further comprising formatting, by the processor, the first layer of metadata for operations.

5. The method of claim 1, further comprising formatting, by the processor, the third layer of metadata by reducing a number of columns or a number of rows in the third layer of metadata.

6. The method of claim 1, wherein the second layer of metadata comprises at least one of: a primary key indicator, a string indicator, a type indicator, a categorical indicator, or a continuous indicator, the primary key indicator is a unique identifier for a row in the data set, the string indicator is assigned based on contents of the row in a column, the categorical indicator identifies the data set as descriptive of discrete characteristics, and the continuous indicator identifies the data set as representative of measurements on a continuous scale.

7. The method of claim 1, further comprising determining, by the processor, a data type for a column in the first layer of metadata based at least in part on running a regular expression on the first layer of metadata.

8. The method of claim 1, further comprising computing, by the processor, percentile calculations for a column of a plurality of columns.

9. The method of claim 1, further comprising formatting, by the processor, the first layer of metadata and the second layer of metadata for recursive decisioning.

10. The method of claim 1, wherein the data set is stored on a distributed storage system.

11. The method of claim 10, further comprising communicating, by the processor, with the distributed storage system across a network.

12. The method of claim 10, wherein the processor is in a node of the distributed storage system.

13. A computer-based system, comprising:
a computing device that comprises a processor, and
a memory configured to communicate with the processor, the memory having instructions stored thereon that, in response to execution by the processor, cause the computing device to at least:
generate a numerical indicator for a portion of a first layer of metadata of a data set based at least in part on a first rule based decisioning determining that the portion of the first layer of metadata includes numerical data;
apply a second rule based decisioning to the first layer of metadata to generate a second layer of metadata, wherein the second layer of metadata comprises the numerical indicator and a numeric analysis for the portion of the first layer of the metadata that includes the numerical data;
generate a third layer of metadata by collating the first layer of metadata and the second layer of metadata into a table for a file, wherein the first layer of metadata and the second layer of metadata collated in an order in which the first layer of metadata and the second layer of metadata were generated, the third layer of metadata comprises derived data that is generated from a combination of the first layer of metadata and the second layer of metadata;
determine to generate a fourth layer of metadata based at least in part on the third layer of metadata;
execute a function call based at least in part on an input of the third layer of metadata, wherein the third layer of metadata is inputted to the function call in response to the determination to generate the fourth layer of metadata, and the function call generates the fourth layer of metadata; and generate an output file based at least in part on the fourth layer of metadata.

14. The system of claim 13, further comprising:
receiving, by the processor, the data set comprising data within a plurality of rows and a plurality of columns;
analyzing, by the processor, a first column of the plurality of columns in the data set to identify traits of the first column; and
iteratively analyzing, by the processor, each additional column of the plurality of columns in the data set to identify traits of each additional column.

15. The system of claim 13, wherein the traits of data include at least one of: a first respective indicator as to whether a column stores numeric data, a second respective indicator as to whether the column stores string data, a number of filled cells in the column, or most common values in the column.

16. The system of claim 13, further comprising formatting, by the processor, the first layer of metadata for operations.

17. The system of claim 13, further comprising formatting, by the processor, the first layer of metadata for operations by compiling all metadata generated for the first layer of metadata into a single table with rows corresponding to field values.

18. A non-transitory computer medium having instructions executable in a computing device, wherein, when executed, the instructions cause the computing device to at least:
generate a numerical indicator for a portion of a first layer of metadata of a data set based at least in part on a first rule based decisioning determining that the portion of the first layer of metadata includes numerical data;
apply a second rule based decisioning to the first layer of metadata to generate a second layer of metadata, wherein the second layer of metadata comprises the numerical indicator and a numeric analysis for the portion of the first layer of the metadata that includes the numerical data;
generate a third layer of metadata by collating the first layer of metadata and the second layer of metadata into a table for a file, wherein the first layer of metadata and the second layer of metadata collated in an order in which the first layer of metadata and the second layer of metadata were generated, and the third layer of metadata comprises derived data that is generated from a combination of the first layer of metadata and the second layer of metadata;
determine to generate a fourth layer of metadata based at least in part on the third layer of metadata;
execute a function call based at least in part on an input of the third layer of metadata, wherein the third layer of metadata is inputted to the function call in response to the determination to generate the fourth layer of metadata, and the function call generates the fourth layer of metadata; and
generate an output file based at least in part on the fourth layer of metadata.

19. The non-transitory computer medium of claim 18, wherein the instructions, when executed, further cause the computing device to at least:
condense the table by deleting a duplicate column identified in the table.

20. The non-transitory computer medium of claim 18, wherein the numeric analysis for the portion of the first layer of the metadata comprises a statistical distribution of the portion of the first layer of the metadata, wherein the statistical distribution comprises a distribution of frequently appearing values in the portion of the first layer of the metadata.

* * * * *